United States Patent
Hohmann et al.

(10) Patent No.: US 8,616,094 B2
(45) Date of Patent: Dec. 31, 2013

(54) METHOD FOR TENSIONING SCREW BOLTS, AS WELL AS SCREW BOLT AND SCREW BOLT TENSIONING DEVICE FOR CARRYING OUT THE METHOD

(76) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 360 days.

(21) Appl. No.: 13/013,574

(22) Filed: Jan. 25, 2011

(65) Prior Publication Data

US 2011/0188960 A1 Aug. 4, 2011

Related U.S. Application Data

(60) Provisional application No. 61/300,659, filed on Feb. 2, 2010.

(30) Foreign Application Priority Data

Feb. 2, 2010 (DE) .......................... 10 2010 006 562

(51) Int. Cl.
*B25B 29/02* (2006.01)
*F16B 31/00* (2006.01)
*B21D 39/00* (2006.01)

(52) U.S. Cl.
USPC ......... 81/57.38; 411/14.5; 29/452; 29/525.11

(58) Field of Classification Search
USPC .............. 81/57.38; 29/446, 452, 505, 407.05, 29/407.08, 525.11, 525.01, 525.05; 411/14.5; 73/761
See application file for complete search history.

(56) References Cited

U.S. PATENT DOCUMENTS

| 2,866,370 | A | * | 12/1958 | Biach | 81/57.37 |
|---|---|---|---|---|---|
| 3,015,975 | A | * | 1/1962 | Biach | 81/57.38 |
| 4,844,418 | A | * | 7/1989 | Cole | 254/29 A |
| 5,253,967 | A | * | 10/1993 | Orban et al. | 411/432 |
| 5,452,629 | A | * | 9/1995 | Heiermann et al. | 81/57.38 |
| 5,956,917 | A | * | 9/1999 | Reynolds | 52/655.1 |
| 8,266,781 | B2 | * | 9/2012 | Bucknell | 29/452 |
| 2004/0165963 | A1 | | 8/2004 | Bucknell | |
| 2008/0301926 | A1 | * | 12/2008 | Bucknell | 29/452 |

FOREIGN PATENT DOCUMENTS

| DE | 196 38 901 A1 | 3/1998 |
|---|---|---|
| DE | 101 45 847 A1 | 4/2003 |
| DE | 10143406 | 4/2003 |
| DE | 10 2004 043 146 | 11/2005 |
| DE | 10 2004 043 145 B3 | 5/2006 |
| DE | 10 2005 015 922 A1 | 10/2006 |
| EP | 0080743 | 6/1983 |
| EP | 0797012 | 9/1997 |

(Continued)

OTHER PUBLICATIONS

European Search Report; Application No. EP 11000321; dated Jun. 24, 2011; 7 pages.

(Continued)

*Primary Examiner* — David B Thomas

(74) *Attorney, Agent, or Firm* — Thomas & Karceski, P.C.

(57) ABSTRACT

This invention relates to a method for hydraulically tensioning screw bolts as well as to screw bolts and screw bolt tensioning devices for carrying out the method. It is proposed to apply the total pretensioning force for one part via an external thread and for the remaining part via an internal thread of the bolt end.

15 Claims, 5 Drawing Sheets

(56) References Cited

FOREIGN PATENT DOCUMENTS

| | | | |
|---|---|---|---|
| EP | 0 830 919 | 3/1998 | |
| JP | 10037930 A * | 2/1998 | ............ F16B 31/00 |
| WO | WO 95 15835 | 6/1995 | |
| WO | 9641703 | 12/1996 | |
| WO | 9738827 | 10/1997 | |
| WO | WO 03 024670 A1 | 3/2003 | |
| WO | WO 2006 027060 | 3/2006 | |
| WO | WO 2006 027061 A1 | 3/2006 | |

OTHER PUBLICATIONS

Japanese Office Action; Japanese Patent Application No. 2011-018568; mailed Dec. 3, 2012; 1 page.

* cited by examiner

METHOD FOR TENSIONING SCREW BOLTS, AS WELL AS SCREW BOLT AND SCREW BOLT TENSIONING DEVICE FOR CARRYING OUT THE METHOD

CROSS-REFERENCE TO RELATED APPLICATION(S)

This Non-Provisional United States patent application relies for priority on U.S. Provisional Patent Application Ser. No. 61/300,659, filed on Feb. 2, 2010, and on German Utility Model Application No. 10 2010 006 562.5, filed on Feb. 2, 2010, the contents of both of which are incorporated herein by reference.

FIELD OF THE INVENTION

This invention relates to a method for tensioning screw bolts which extend through machine parts to be clamped to each other and include a bolt head, which is supported on one side of the machine parts, and include a bolt end which is provided for being screwed to a screw bolt tensioning device. Furthermore, this invention relates to screw bolts and screw bolt tensioning devices for carrying out the method.

DESCRIPTION OF THE RELATED ART

In the present application, the term "bolt end" refers to the end of the screw bolt which is engaged by a screw bolt tensioning device. The other end of the screw bolt is referred to as "bolt head", even if this bolt head likewise is formed by a nut screwed onto a thread.

Onto a screw bolt, an exactly specified pretensioning force must be applied, in order to be able to tighten or release the nut screwed onto the bolt end. For this purpose, an exchange bushing in the screw bolt tensioning device is screwed onto the thread end protruding from the nut and thereafter the screw bolt tensioning device is put under hydraulic pressure. When the specified screw bolt extension or elongation is reached, the nut screwed onto the bolt end is screwed down for bearing against the machine part.

For reducing manufacturing and assembly times and the space requirement it is desired to reduce the number of screw bolts by using larger screw bolts and/or higher-strength screw bolts. However, the same require high pretensioning forces for whose introduction into the screw bolt the dimensions of the force-transmitting parts must be increased, which in turn impairs the reduction of the space requirement.

SUMMARY OF THE INVENTION

It is an aspect underlying the present invention to apply high pretensioning forces onto screw bolts with as little effort as possible.

In accordance with the invention, a method is provided to a screw bolt with screw bolt tensioning devices.

By means of the measures of the invention, the length of the bolt end protruding from the nut, which is required for transmitting the pretensioning force, can be reduced considerably, so that both the required total length of the screw bolt and the corresponding dimensions of the screw bolt tensioning device are distinctly reduced. Since the bolt end in accordance with the invention is provided with an external thread and with an internal thread and the required total pretensioning force is applied only for one part via the external thread and for the remaining part via the internal thread, the external thread is relieved, so that its required length can be reduced without the same shearing off. The division of the total pretensioning force on the external thread and the internal thread can vary and is adapted to the respective requirements.

It is conceivable for example with large screw bolt cross-sections that a screw bolt has a plurality of internal threads. What is preferred, however, is only one internal thread which extends coaxially to the external thread.

In such a case, the idea also is that the internal thread and the external thread should be designed to have the same direction of rotation and should be adjusted to each other such that a screw bolt tensioning device in which both counter-threads are formed and are firmly, i.e. integrally connected with each other can be screwed both to the internal thread and to the external thread of the bolt end at the same time.

With a screw bolt tensioning device, a screw bolt whose bolt end has an external thread and an internal thread can be tensioned in a simple and space-saving manner. Since an outer exchange bushing is formed for the external thread of the bolt end and an inner exchange bushing is formed for the internal thread of the bolt end, wherein the inner exchange bushing is rotatable and axially displaceable with respect to the outer one, both can independently be screwed to the bolt end. In this way, the respective pairs of thread and counter-thread also are independent of each other and can optimally be adapted to the respective requirements separate from each other. Thus, the threads for example can also be designed conically. Each exchange bushing is axially displaceable by means of its own piston, wherein both pistons are connected to a pressure-medium source such that a simultaneous application of the respective pretensioning force portions (components) to the respective threads is ensured. For example, the pressure-medium source or the pressure-medium port can be designed as a uniform or common pressure-medium port. In this application, the term "pressure medium" relates to hydraulic pressure media. The active piston areas of the first and the second piston have the same size ratio relative to each other as the components of the total pretensioning force to be transmitted by the two exchange bushings.

Preferably, the inner exchange bushing is spring-biased with respect to the outer exchange bushing in the direction facing away from the supporting surface. Due to the spring bias, the inner exchange bushing not screwed in always is moved into a defined starting position.

The same preferably is indicated in that in the relaxed condition of the spring the second end of the inner exchange bushing protrudes from a lid of the screw bolt tensioning device, which is mounted on the second end face of the cylinder opposite the supporting surface, by a specified length, wherein the spring deflection is so great that the inner exchange bushing can be displaced by a specified amount before being screwed into the bolt end. When the inner exchange bushing is screwed into the internal thread of the bolt end, this protrusion is reduced, so that the magnitude of the reduction is a measure for the screw-in depth of the inner exchange bushing. In this way, a wrong assembly due to an inner exchange bushing only partly screwed in can be detected and hence can be avoided.

In a favorable development of the invention, the specified protrusion length is equal to the sum of the clear distance between the inner exchange bushing and the bolt end in the screwed condition of the outer exchange bushing and the minimum screw-in depth of the inner exchange bushing into the internal thread of the bolt end. With this measure, the correct screw connection of the inner exchange bushing can be detected in a simple way in that the inner exchange bushing does not protrude from the lid, but terminates flush with the same.

A screw bolt tensioning device in accordance with the invention advantageously includes a hydraulic valve which can be transferred from a first valve position, in which it blocks the supply of the pressure-medium supplies with pressure medium, into a second valve position, in which it enables said supply, and back by means of an actuator which can be actuated by the inner exchange bushing in specified positions of the same. In this way, it can be achieved that pressure medium only is supplied, i.e. the pretensioning force only is applied, when the inner exchange bushing is correctly screwed to the bolt end. A damage of the screw bolt and/or of the screw bolt tensioning device or even a damage to persons thereby can be prevented.

The actuator preferably extends parallel to the end face of the lid at a clear distance to the same, which is smaller than the protrusion length and is at least as large as the provided stretch length of the screw bolt, wherein the actuator is spring-biased towards the inner exchange bushing, can be displaced from the inner exchange bushing against the spring force when the protrusion is greater than the clear distance, and wherein the actuator in the displaced condition transfers the valve into the first valve position and in the non-displaced condition transfers the valve into the second valve position. These measures include two safety aspects. On the one hand it is ensured that—as explained above—pressure medium only is supplied when the required minimum screw-in depth for the inner exchange bushing is reached. On the other hand—when the clear distance is equal to the desired stretch length of the screw bolt—the pressure medium supply is shut off again when the intended stretch length of the screw bolt is exceeded during the tensioning operation, as then the protrusion of the inner exchange bushing becomes so large that the actuator is displaced against the spring force and hence the valve is transferred into the first valve position.

In a screw bolt tensioning device of the invention, the outer and the inner exchange bushing are firmly connected with each other or designed in one piece. In this case, both threads are simultaneously screwed into their corresponding counter-threads in the bolt end, so that the number of the working steps is reduced. In this embodiment, all threads must exactly be adjusted to each other, for example in terms of thread base (entry of thread) and thread pitch, in order to ensure an easy screwing of both threads at the same time.

BRIEF DESCRIPTION OF THE DRAWINGS

The invention will subsequently be explained in greater detail by way of example with reference to the drawings, in which.

DETAILED DESCRIPTION OF EMBODIMENT(S) OF THE INVENTION

Figure 1:
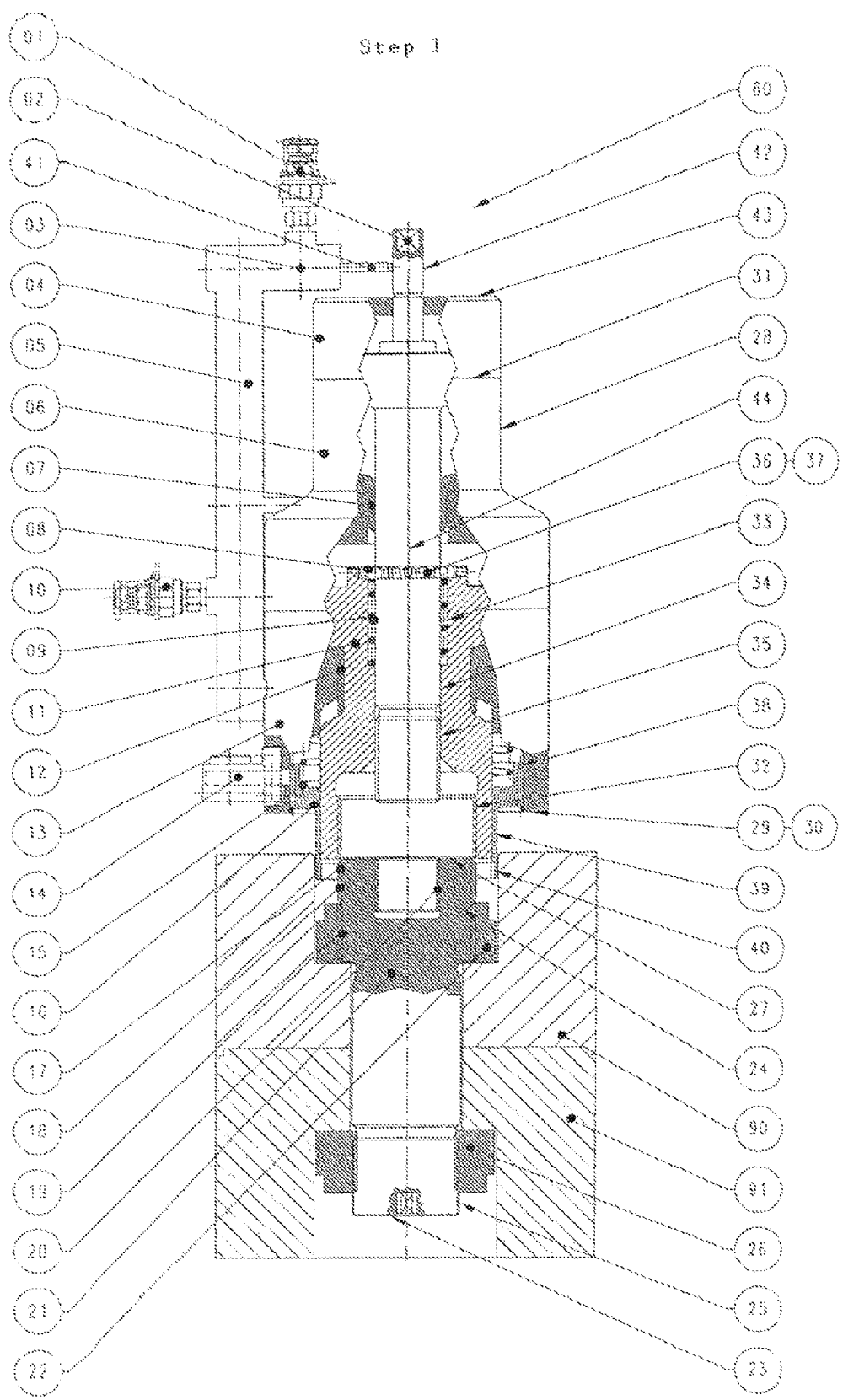
FIGS. 1 to 5 show a partly sectional front view of an embodiment of a screw bolt of the invention and of a screw bolt tensioning device of the invention, illustrated in five steps when tightening the screw bolt.

In the embodiment shown in FIGS. 1 to 5, a screw bolt 21 should clamp two machine parts 90, 91 to each other and therefore be tensioned with a screw bolt tensioning device 60.

The screw bolt 21 and the screw bolt tensioning device 60 first are described with reference to FIG. 1.

The screw bolt 21 is sunk into the machine parts 90, 91, which are clamped to each other both with the bolt head 23 and with the bolt end 24. The bolt head 23 includes an external thread 25 onto which a nut 26 is screwed. The nut 26 rests against the lower machine part 91 as shown in the Figures.

The bolt end 24 includes an external thread 18 and an internal thread 20 extending coaxially thereto from the end face 27, i.e. from the end surface. With respect to the formation and direction of rotation, these threads 18, 20 are independent of each other in the illustrated embodiment and can optimally be adapted to the respective requirements. For example, the threads can also have a conical shape. Onto the external thread 18 of the bolt end 24 a nut 22 with a nut thread 19 is screwed, which rests against the upper machine part 90 as shown in the Figures.

Figure 2:
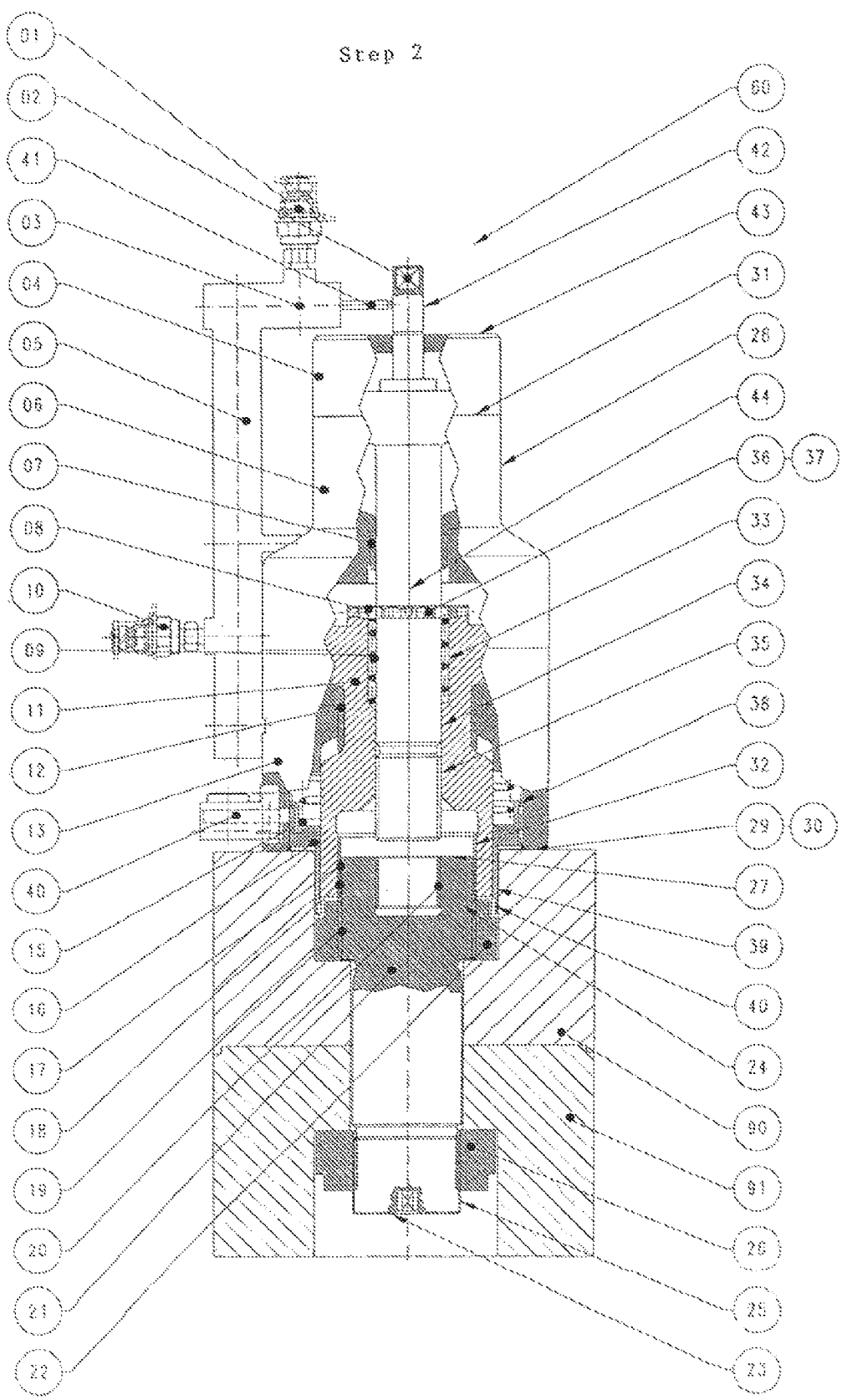
Figure 3:
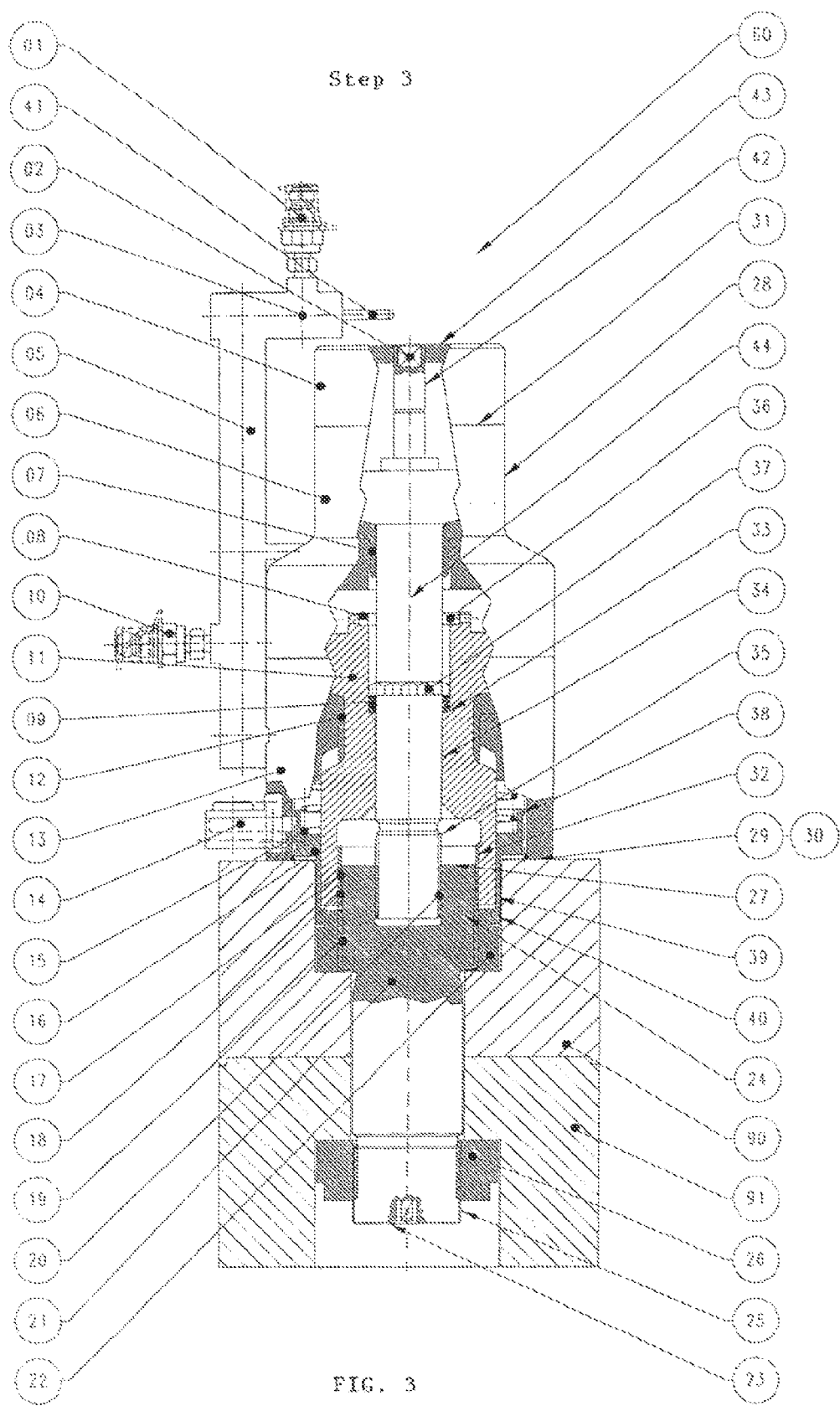

In the steps as shown in FIGS. 1 to 3, no pretensioning force has yet been applied to the screw bolt 21, so that the nuts 22, 26 also still rest against the machine parts 90, 91 without pressing pressure.

The screw bolt tensioning device 60 includes a cylinder 28 which on a first end face 29 has a supporting surface 30 for supporting on a machine part 90 and on its second end face 31 is covered by a lid 4. The cylinder 28 is formed of a first and of a second cylinder portion 13, 6 which are arranged one behind the other along the cylinder axis 44 (FIG. 2).

In the cylinder 28—substantially in the first cylinder portion 13—an outer exchange bushing 11 is arranged, which is mounted to be rotatable and axially displaceable with respect to the cylinder 28. With a first portion 32, the outer exchange bushing 11 protrudes from the first end face 29 radially inwards of the ring-shaped supporting surface 30. In the protruding part, the outer exchange bushing 11 includes an internal thread 17, which is designed for being screwed to the external thread 18 of the bolt end 24. The outer exchange bushing 11 protrudes from the supporting surface 30 by the measure which corresponds to the desired screwing height, so that upon reaching the desired screwing height, the cylinder 28 rests against the machine part 90 with its supporting surface 30.

A second portion 33 of the outer exchange bushing 11, which adjoins the first portion 32 on its side facing away from the supporting surface 30, includes an axial through bore 34 which opens into the first portion 32.

An inner exchange bushing 2 extends through the lid 4 and the second cylinder portion 6 as well as the axial through bore 34 and, at its first end, protrudes from the axial through bore 34 into the first portion 32 of the outer exchange bushing 11. At this end, the inner exchange bushing 2 includes an external thread 35, which is designed for being screwed to the internal thread 20 of the bolt end 24. With its second end, the inner exchange bushing 2 protrudes from the lid 4, where it forms a protrusion 42 with a specified length.

Figure 4:
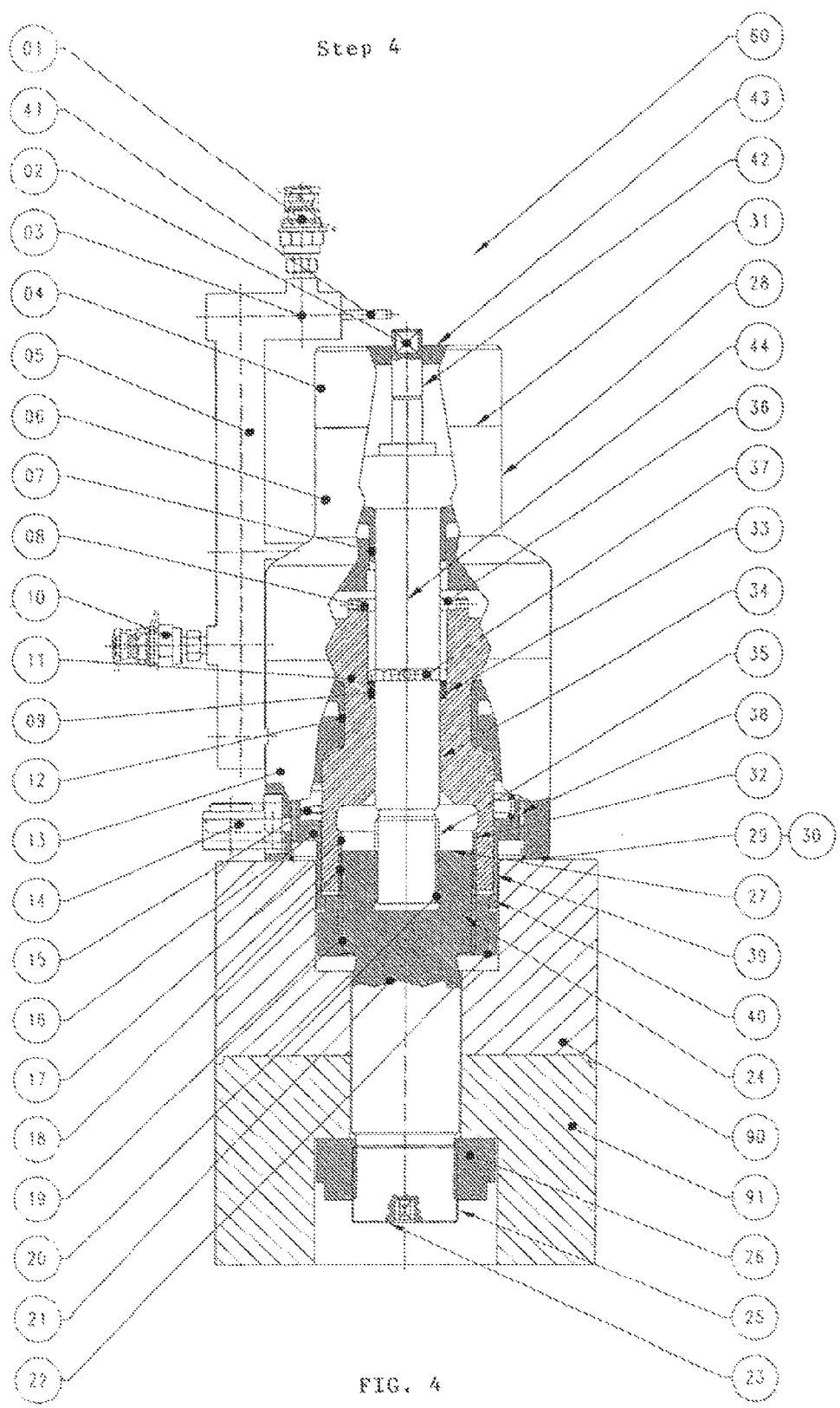
Figure 5:
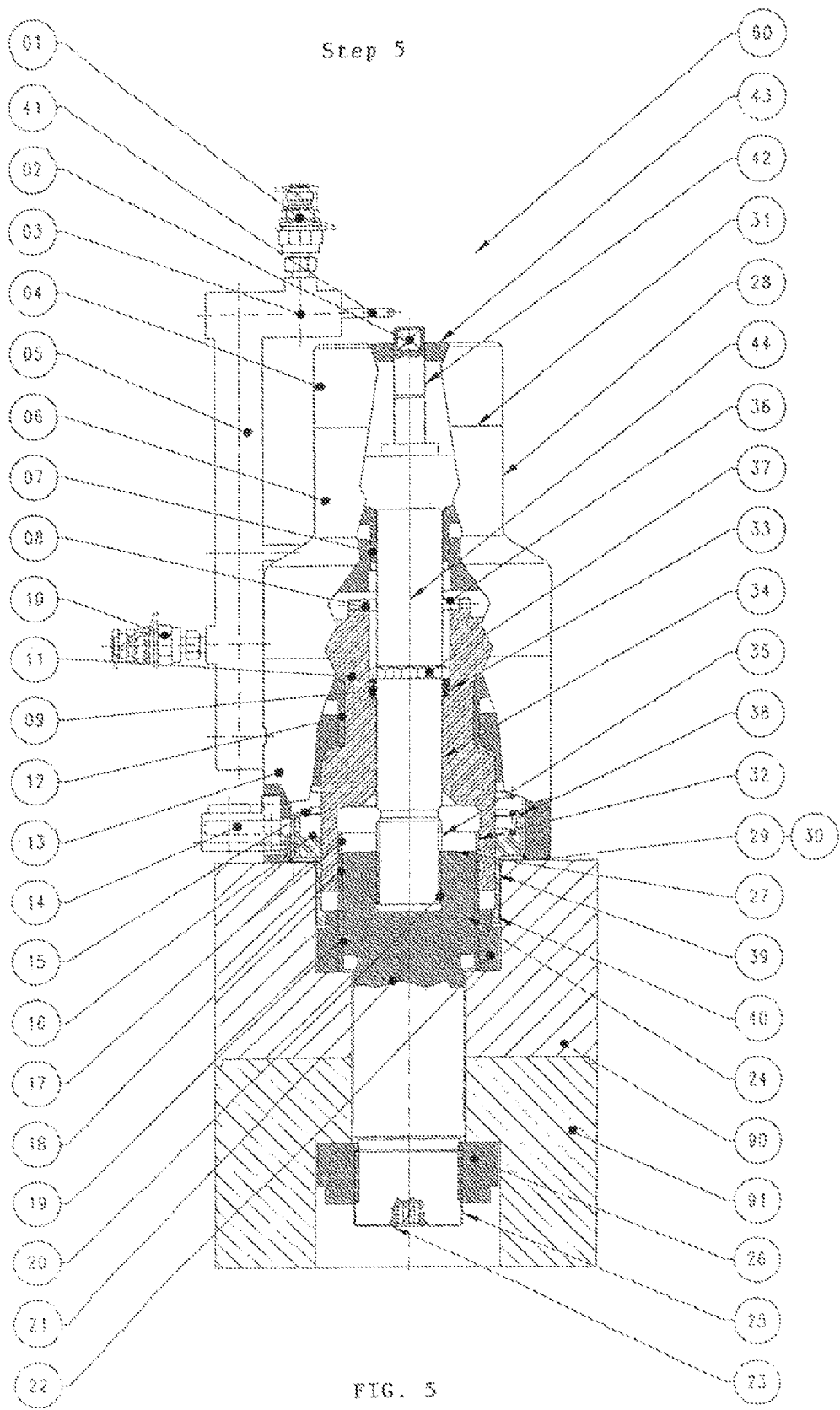

The inner exchange bushing 2 is axially displaceable with respect to the outer exchange bushing 11 and with respect to the second cylinder portion 6. In a position of axial displacement, the inner exchange bushing 2 is non-rotatably connected with the outer exchange bushing 11 (FIGS. 1 and 2); in the remaining positions of displacement, the inner exchange bushing 2 is rotatable with respect to the outer exchange bushing 11 (FIGS. 3 to 5).

The non-rotatable connection is effected by means of a ring-shaped hexagonal adapter 8, which in radial direction includes at least two partial rings 36, 37 (FIG. 3) which are axially displaceable, but not rotatable against each other. The outer partial ring 36 is firmly connected with the outer exchange bushing 11. The inner partial ring 37 encloses the inner exchange hushing 2 and is firmly connected with the same. On its radially outer side, the inner partial ring 37 includes a profile which engages in a corresponding profile of the outer partial ring 36, in order to prevent a rotation of the inner exchange bushing 2 relative to the outer exchange bushing 11.

The inner partial ring 37 is in contact with an end of a spiral spring 9 which encloses the inner exchange bushing 2 and biases the same with respect to the outer exchange bushing 11 in the direction acing away from the first end face 29 of the cylinder 28, i.e. in direction of the lid 4. This spiral spring 9 encloses the inner exchange bushing 2 on a longitudinal portion and is accommodated in a recess in the second portion 33 of the outer exchange bushing 11. With its other end, the spiral spring 9 rests against the bottom of the recess.

The two partial rings 36, 37 are in engagement with each other when the spring 9 is relaxed, i.e. in the starting condition before screwing in the inner exchange bushing 2. In the starting condition, the outer exchange bushing 11 thus can be screwed onto the external thread 18 of the bolt end 24 by rotating the inner exchange bushing 2. The outer exchange bushing 11 is firmly connected with a first ring-shaped piston 12, which encloses the same and is axially displaceable with respect to the cylinder 28 in the direction facing away from the supporting surface 30 by a hydraulic pressure medium. With the first piston 12 the outer exchange bushing 11 also is displaced. In the first cylinder portion 13 a first pressure medium supply is formed for the first piston 12.

In the second cylinder portion 6, the inner exchange bushing 2 is enclosed by a second ring-shaped piston 7 and firmly connected with the same. This second piston 7 also is axially displaceable by pressure media in the direction facing away from the supporting surface 30, wherein the inner exchange bushing 2 also is displaced by displacing the second piston 7. In the second cylinder portion 6 a second pressure medium supply is formed for the second piston 7.

The active piston areas of the first and the second piston 12, 7 have the same size ratio relative to each other as the portions (components) of the total pretensioning force to be transmitted by the two exchange bushings 11, 2.

Both pressure medium supplies are connected to a common pressure medium port 5, so that a pressurization and hence a displacement of the two pistons 12, 7 exclusively can be effected together.

The pressure medium port 5 is a pressure medium distributor, which is provided with a connection nipple 10 for a high-pressure hose.

Close to the first end face 29 of the cylinder 28 between the first cylinder portion 13 and the outer exchange bushing 11 a rotary sleeve 16 is arranged, which is rotatable both with respect to the first cylinder portion 13 and with respect to the outer exchange bushing 11. This rotary sleeve 16 has a first portion 38 which is arranged inside the first cylinder portion 13 and is aligned with the supporting surface 30.

A spiral spring 15, which encloses the outer exchange bushing 11 and with one end rests against the first cylinder portion 13 and with the other end against the first portion 38 of the rotary sleeve 16, biases the rotary sleeve 16 in direction of the supporting surface 30, so that even with an axial displacement of the outer exchange bushing 11 the rotary sleeve 16 maintains its position, i.e. its first portion 38 is aligned with the supporting surface 30.

A second portion 39 of the rotary sleeve 16 extends from the first portion 38 along the outside of the part of the outer exchange bushing 11 which protrudes from the supporting surface 30, and is connected with a third portion 40.

The third portion 40 likewise is ring-shaped and, with its radially inner side, can positively, i.e. non-rotatably, be placed against the nut 22, which is screwed onto the bolt end 24.

The first portion 38 of the rotary sleeve 16 includes an external toothing which is in engagement with gear wheels in a gear wheel connection 14. By rotating the rotary sleeve 16 by means of a gear wheel drive, the nut 22 is screwed down to bear against the machine part 90, when the pretensioning force is applied onto the screw bolt 21 and the same has stretched correspondingly and hence has lifted the nut 22 from bearing against the machine part 90.

The pressure medium port 5 or distributor includes a hydraulic safety valve 3 which can be actuated by an actuator 41. In the illustrated embodiment, the actuator 41 constitutes a pin which can be displaced in its longitudinal direction. In a first valve position, the hydraulic valve 3 blocks the supply of the pressure medium supplies with hydraulic pressure medium and in a second valve position enables this supply. By displacing the pin 41, the hydraulic valve 3 is transferred from the one into the other valve position.

The pin 41 extends parallel to the end face 43 of the lid 4 up to the inner exchange bushing 2, i.e. into the space which can also be taken by the protrusion 42, so that, in specified positions of the inner exchange bushing 2, the pin 41 is displaced by its protrusion 42. The pin 41 is spring-biased in direction of the inner exchange bushing 2 and can be displaced by the protrusion 42 against the spring force.

In the illustrated embodiment, the length of the protrusion 42 in the condition of the inner exchange hushing 2 not screwed in, i.e. with relaxed spring 9, is the sum of the desired screw-in depth of the inner exchange bushing 2 into the internal thread 20 of the bolt end 24 and the clear distance between the inner exchange bushing 2 and the bolt end 24 when the outer exchange bushing 11 is screwed onto the bolt end 24.

The clear distance is at least as large as the ring width of the ring-shaped hexagonal adapter 8, so that the inner exchange bushing 2 can axially be displaced at least to such an extent that it is freely rotatable with respect to the outer exchange bushing 11.

With this length of the protrusion 42, its free end lies flush in the end face 43 of the lid 4 when the inner exchange bushing 2 has reached its desired screw-in depth (FIG. 3).

In the illustrated embodiment, the pin 41 of the hydraulic valve 3 extends parallel to the end face 43 of the lid 4 and has a clear distance to the same, which is smaller than the protrusion length indicated above and is at least as large as the desired stretch length of the screw bolt 21.

When the clear distance is equal to the desired stretch length of the screw bolt 21, it is ensured on the one hand that the inner exchange bushing 2 is correctly screwed in when pressurized, i.e. has reached its desired screw-in depth. Hence it is excluded that the thread can tear off. On the other hand it is also ensured that the screw bolt 21 is not overstretched, since upon exceedance of the desired stretch length the protrusion 42 protrudes from the lid 4 to such an extent that it comes in engagement with the pin 41 of the hydraulic valve 3 and displaces the same. As a result, the hydraulic valve 3 would be transferred into the first valve position in which it blocks the supply of the pressure medium supplies.

The tightening operation of a screw bolt 21 by means of the measures of the invention is performed as follows.

First of all, a screw bolt 21 is manufactured, which at its bolt end 24 includes an external thread 18 and an internal thread 20.

This screw bolt 21 is passed through the through bores in the machine parts 90, 91 to be clamped to each other. In the illustrated embodiment, the bolt head 23 likewise is provided with an external thread 25, so that the corresponding nuts 26, 22 can be screwed onto the bolt head 23 and onto the bolt end 24 and be screwed down until they bear against the machine parts 90, 91, without pretensioning force being applied onto the screw bolt 21.

In the first step as shown in FIG. 1, the screw bolt tensioning device 60 then is attached to the bolt end 24 in such a way that the outer exchange bushing 11 and—in the illustrated case of a sunk nut 22—the rotary sleeve 16 also rests against the thread base. This means that the cylinder axis 44 of the screw bolt tensioning device is aligned with the screw bolt axis. The pin 41 of the hydraulic valve 3 is displaced by the protrusion 42 of the inner exchange bushing 2 and the valve 3 thus is in the first valve position in which it blocks the supply of the pressure medium supplies with pressure medium.

In the second step, the outer exchange bushing 11 is screwed onto the external thread 18 of the bolt end, wherein upon reaching the desired screwing height the supporting surface 30 of the cylinder 28 rests against the machine part 90 and the rotary sleeve 16 rests against the nut 22 (FIG. 2).

In the third step, the inner exchange bushing 2 is screwed into the internal thread 20 of the bolt end 24, wherein upon reaching the desired screw-in depth, the free end of the protrusion 42 is aligned with the end face 43 of the lid 4 (FIG. 3). The pin 41 of the hydraulic valve 3 no longer is displaced by the protrusion 42. The valve 3 thus is in the second valve position, in which it enables the supply of the pressure medium supplies with pressure medium.

In the fourth step, pressure medium is supplied to the first and second pistons 12, 7 together, so that the same are axially displaced in the direction facing away from the supporting surface 30 and thereby carry along the outer and inner exchange bushings 11, 2. The total pretensioning force thereby is distributed over the internal thread 20 and the external thread 18 of the bolt end. Corresponding to the total pretensioning force applied, the screw bolt 21 is stretched (FIG. 4).

When reaching the desired expansion or the desired total pre-tensioning force, the nut 22 is screwed down at the bolt end 24 by means of the rotary sleeve 16 until it bears against the machine part 90 (FIG. 5).

Subsequently, the screw bolt tensioning device 60 is relieved in that the pressure medium is discharged again. The inner exchange bushing 2 can be screwed out of the bolt end 24 and is again pushed into its starting position by the spring bias or force 9. Subsequently, the outer exchange bushing 11 is unscrewed from the bolt end 24. Due to a spring bias or force, also the outer exchange bushing 11 is again pushed into its starting position. The screw bolt tensioning device 60 can be removed.

In the discussion provided above, various aspects and features of the present invention have been described in connection with one or more embodiments of the present invention. The specific examples discussed are not intended to limit the scope of the present invention. To the contrary, after understanding the foregoing discussion, those skilled in the art will readily appreciate numerous variations and equivalents with respect to the embodiment(s) discussed herein. The present invention is intended to cover any such variations and equivalents.

What is claimed is:

1. A screw bolt which can be passed through throughbores in machine parts to be clamped together and comprises a bolt head, which is provided for being supported on one side of the machine parts, and a bolt end, which is provided for being screwed to a screw bolt tensioning device and includes an external thread and at least one internal thread extending from the end face along the bolt axis,
    wherein the outer diameter of the bolt end is greater than the diameter of the throughbores.
2. The screw bolt according to claim 1, wherein only one internal thread which extends coaxially to the external thread.
3. The screw bolt according to claim 2, wherein the internal thread and the external thread are formed to have the same direction of rotation and are adjusted to each other such that a screw bolt tensioning device in which both counterthreads are formed and are firmly connected with each other can be screwed both to the internal thread and to the external thread of the bolt end at the same time.
4. A hydraulic screw bolt tensioning device for tensioning a screw bolt according to claim 3 comprising:
    a cylinder with a cylinder axis, which on a first end face includes a supporting surface for supporting on the machine parts,
    an exchange bushing which is arranged in the cylinder so as to be axially displaceable relative to the same and includes an internal thread for screwing onto the external thread of a bolt end and a central pin fixed relative to the internal thread and having an external thread which is screwable into the internal thread of the bolt end, wherein the internal thread and the external thread are formed to have the same direction of rotation and are adjusted to each other such that the exchange bushing is screwable to the external thread and to the internal thread of the bolt end at the same time,
    a piston which is firmly connected with the exchange bushing and is axially displaceable in the cylinder by a pressure medium in the direction facing away from the supporting surface, wherein the cylinder includes a pressure medium supply, and
    a pressure medium port which is in flow connection with the pressure medium supply.
5. A hydraulic screw bolt tensioning device for tensioning a screw bolt according to claim 2, comprising:
    a cylinder with a cylinder axis, which on a first end face includes a supporting surface for supporting on the machine parts,
    an outer exchange bushing arranged in the cylinder so as to be axially displaceable relative to the same and includes a first portion with an internal thread for screwing onto the external thread of a bolt end and a second portion with an axial through bore which opens into the first portion,
    an inner exchange bushing passing through the cylinder and the through bore of the outer exchange bushing and being rotatable and axially displaceable relative to the same and at a first end includes an external thread which is screwed to the internal thread of the bolt end,
    a first piston firmly connected with the outer exchange bushing and being axially displaceable in the cylinder by a pressure medium in the direction facing away from the supporting surface, wherein the cylinder includes a first pressure medium supply,
    a second piston firmly connected with the inner exchange bushing and being axially displaceable in the cylinder by a pressure medium in the direction facing away from the supporting surface, wherein the cylinder includes a second pressure medium supply,
    wherein the size ratio of the active piston areas of the first and second pistons relative to each other corresponds to the size ratio between the portions of the total pretensioning force to be transmitted by the outer and inner exchange bushings, and
    a pressure medium port in fluid connection with the first and with the second pressure medium supplies.
6. The screw bolt tensioning device according to claim 5, wherein the inner exchange bushing is spring-biased relative to the outer exchange bushing in the direction facing away from the supporting surface.
7. The screw bolt tensioning device according to claim 6, wherein, in the relaxed condition of the spring, the second end of the inner exchange bushing protrudes from a lid of the screw bolt tensioning device, which is mounted on the other, second end face of the cylinder, by a specified length, wherein the spring deflection is so great that the inner exchange bushing can be displaced by a specified amount before being screwed into the bolt end.

8. The screw bolt tensioning device according to claim 7, wherein the protrusion length is equal to the sum of the clear distance between the inner exchange bushing and the bolt end in the screwed condition of the outer exchange bushing and the minimum screw-in depth of the inner exchange bushing into the internal thread of the bolt end.

9. A screw bolt tensioning device according to claim 7, wherein a hydraulic valve, which is transferable from a first valve position, in which it blocks the supply of the pressure-medium supplies with pressure medium, into a second valve position, in which it enables said supply, and back by means of an actuator which can be actuated by the inner exchange bushing in specified positions of the same.

10. The screw bolt tensioning device according to claim 9, wherein the actuator:
   extends parallel to the end face of the lid at a clear distance to the same, which is smaller than the protrusion length according to claim 8 and at least as large as the desired stretch length of the screw bolt,
   is spring-biased towards the inner exchange bushing,
   is displaceable by the inner exchange bushing against the spring force, when the protrusion is greater than the clear distance, and
   in the displaced condition, transfers the valve into the first valve position and, in the non-displaced condition, into the second valve position.

11. A hydraulic screw bolt tensioning device for tensioning a screw bolt which can be passed through throughbores in machine parts to be clamped together and comprises a bolt head, which is provided for being supported on one side of the machine parts, and a bolt end, which is provided for being screwed to a screw bolt tensioning device and includes an external thread and at least one internal thread extending from the end face along the bolt axis, comprising:
   a cylinder with a cylinder axis, which on a first end face includes a supporting surface for supporting on the machine parts,
   an outer exchange bushing arranged in the cylinder so as to be axially displaceable relative to the same and includes a first portion with an internal thread for screwing onto the external thread of a bolt end and a second portion with an axial through bore which opens into the first portion,
   an inner exchange bushing passing through the cylinder and the through bore of the outer exchange bushing and being rotatable and axially displaceable relative to the same and at a first end includes an external thread which is screwed to the internal thread of the bolt end,
   a first piston firmly connected with the outer exchange bushing and being axially displaceable in the cylinder by a pressure medium in the direction facing away from the supporting surface, wherein the cylinder includes a first pressure medium supply,
   a second piston firmly connected with the inner exchange bushing and being axially displaceable in the cylinder by a pressure medium in the direction facing away from the supporting surface, wherein the cylinder includes a second pressure medium supply,
   wherein the size ratio of the active piston areas of the first and second pistons relative to each other corresponds to the size ratio between the portions of the total pretensioning force to be transmitted by the outer and inner exchange bushings, and
   a pressure medium port in fluid connection with the first and with the second pressure medium supply.

12. A screw bolt tensioning device according to claim 11, wherein the inner exchange bushing is spring-biased relative to the outer exchange bushing in the direction facing away from the supporting surface.

13. A screw bolt tensioning device according to claim 12, wherein, in the relaxed condition of the spring, the second end of the inner exchange bushing protrudes from a lid of the screw bolt tensioning device, which is mounted on the other, second end face of the cylinder, by a specified length, wherein the spring deflection is so great that the inner exchange bushing can be displaced by a specified amount before being screwed into the bolt end.

14. A screw bolt tensioning device according to claim 13, wherein a hydraulic valve, which is transferrable from a first valve position, in which it blocks the supply of the pressure-medium supplies with pressure medium, into a second valve position, in which it enables said supply, and back by means of an actuator which can be actuated by the inner exchange bushing in specified positions of the same.

15. A screw bolt tensioning device according to claim 14, wherein the actuator:
   extends parallel to the end face of the lid at a clear distance to the same, which is smaller than the protrusion length according to claim 8 and at least as large as the desired stretch length of the screw bolt,
   is spring-biased towards the inner exchange bushing,
   is displaced by the inner exchange bushing against the spring force, when the protrusion is greater than the clear distance, and
   in the displaced condition transfers the valve into the first valve position and, in the non-displaced condition, into the second valve position.

* * * * *